United States Patent
Vajravel (10) Patent No.: US 10,044,810 B2
(45) Date of Patent: Aug. 7, 2018

(54) SELECTIVELY IMPLEMENTING RELIABILITY MECHANISMS BASED ON THE TYPE OF USB DEVICE THAT IS REDIRECTED OVER A REMOTE SESSION

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

(*) Notice: Subject to any disclaimer, the term of this patent is extended or adjusted under 35 U.S.C. 154(b) by 248 days.

(21) Appl. No.: 15/087,134

(22) Filed: Mar. 31, 2016

(65) Prior Publication Data

US 2017/0289262 A1    Oct. 5, 2017

(51) Int. Cl.
| | | |
|---|---|---|
| H04L 29/08 | (2006.01) | |
| H04L 12/26 | (2006.01) | |
| H04L 29/06 | (2006.01) | |
| H04L 12/24 | (2006.01) | |
| G06F 13/42 | (2006.01) | |

(52) U.S. Cl.
CPC ........ H04L 67/141 (2013.01); G06F 13/4282 (2013.01); H04L 41/12 (2013.01); H04L 43/0829 (2013.01); H04L 67/10 (2013.01); H04L 69/16 (2013.01); H04L 69/22 (2013.01); H04L 69/329 (2013.01)

(58) Field of Classification Search
CPC .. G06F 13/4282; G06F 9/452; G06F 9/45533; G06F 9/45558; G06F 21/566; G06F 2221/034; H04L 43/0829; H04L 67/10; H04L 67/141; H04L 69/16; H04L 69/22; H04L 69/329; H04L 41/12; H04L 67/28; H04L 67/42
See application file for complete search history.

(56) References Cited

U.S. PATENT DOCUMENTS

| | | | | |
|---|---|---|---|---|
| 6,636,929 B1* | 10/2003 | Frantz | ................ | G06F 11/0709 710/104 |
| 9,086,897 B2* | 7/2015 | Oh | ........................ | G06F 9/4445 |
| 9,094,230 B1* | 7/2015 | Qian | ..................... | H04L 1/1607 |
| 9,436,644 B1* | 9/2016 | Haymond | ............... | G06F 13/10 |
| 9,507,615 B2* | 11/2016 | McKenzie | ............. | G06F 21/83 |
| 2006/0282577 A1* | 12/2006 | Huang | .................. | G06F 13/385 710/62 |

(Continued)

*Primary Examiner* — Sm Rahman
*Assistant Examiner* — Ranjan Pant
(74) *Attorney, Agent, or Firm* — Kirton McConkie; Brian Tucker (57) ABSTRACT

Reliability mechanisms for a connection can be selectively implemented based on the type of USB device that is redirected over a remote session. When a client attempts to redirect a device over a remote session, an agent on the server can be configured to detect the type of device that is being redirected. If the device is a mass storage device that implements the SCSI standard, and if a connectionless datagram protocol is employed to establish the connection, the agent can implement some reliability mechanisms such as reordering and windowing but not the recovery of lost packets. In contrast, if the device does not implement the SCSI standard, the agent can implement each reliability mechanism including the recovery of lost packets.

19 Claims, 9 Drawing Sheets

(56) References Cited

U.S. PATENT DOCUMENTS

| | | | |
|---|---|---|---|
| 2007/0005867 A1* | 1/2007 | Diamant | G06F 13/385 710/306 |
| 2010/0094928 A1* | 4/2010 | Nakamura | H04L 67/125 709/203 |
| 2010/0306417 A1* | 12/2010 | Stephens | G06F 13/1631 710/5 |
| 2011/0099297 A1* | 4/2011 | Hayton | G06F 9/4411 710/8 |
| 2011/0246904 A1* | 10/2011 | Pinto | G06F 9/4445 715/740 |
| 2015/0255053 A1* | 9/2015 | Nelson | G10H 1/0066 84/645 |
| 2016/0188356 A1* | 6/2016 | Ramasamy | G06F 9/45558 718/1 |
| 2016/0286003 A1* | 9/2016 | Pessis | H04L 67/42 |

* cited by examiner

SELECTIVELY IMPLEMENTING RELIABILITY MECHANISMS BASED ON THE TYPE OF USB DEVICE THAT IS REDIRECTED OVER A REMOTE SESSION

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

Figure 1:
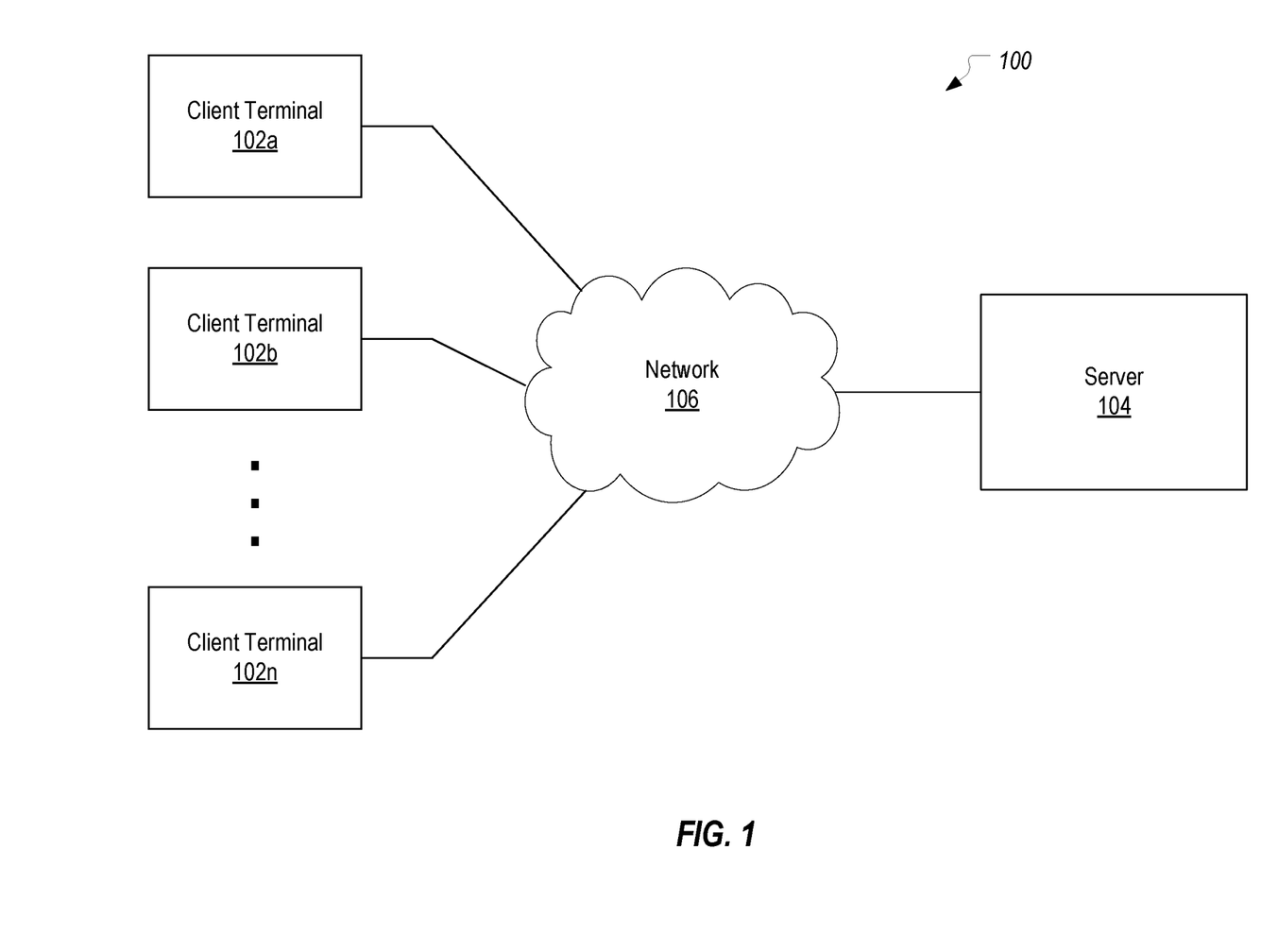
FIG. 1 illustrates an example computing environment in which the present invention can be implemented.
Figure 2:
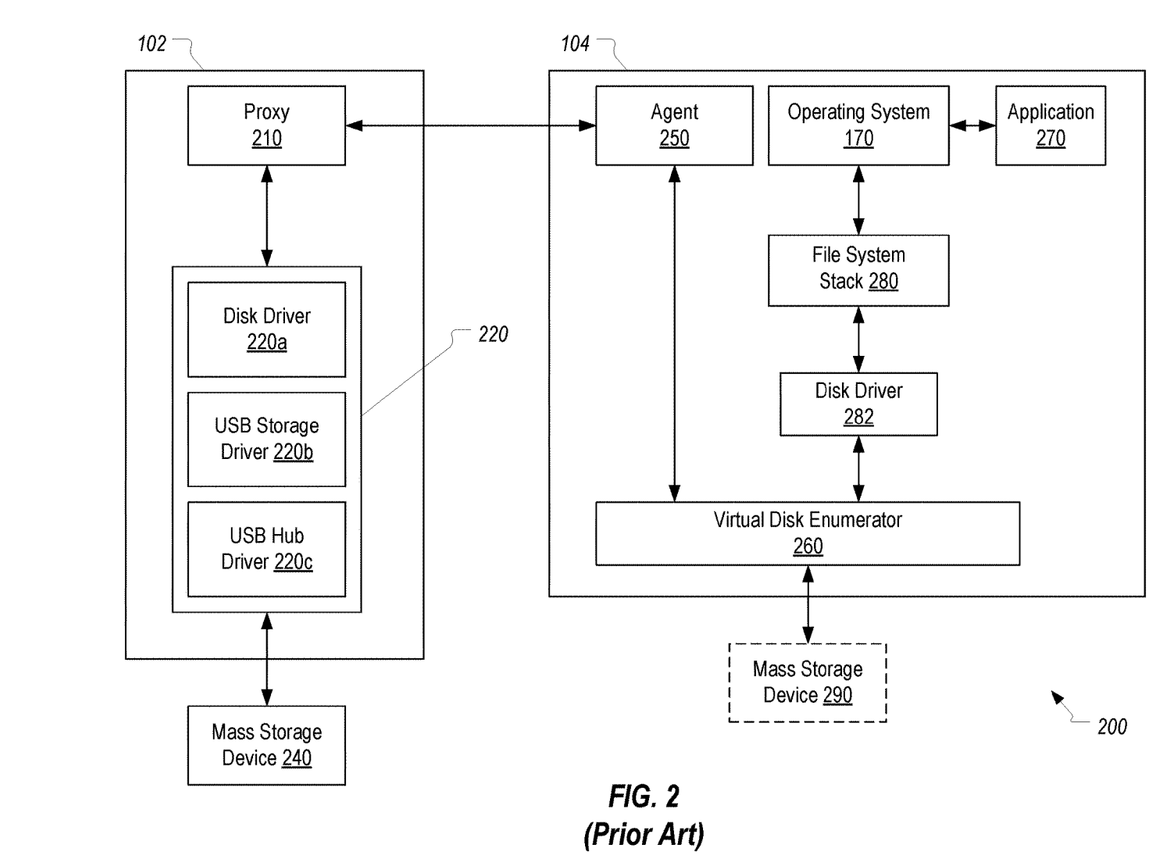
FIG. 2 illustrates how a USB mass storage device connected to a client can be redirected over a remote session to the server.
Figure 3:
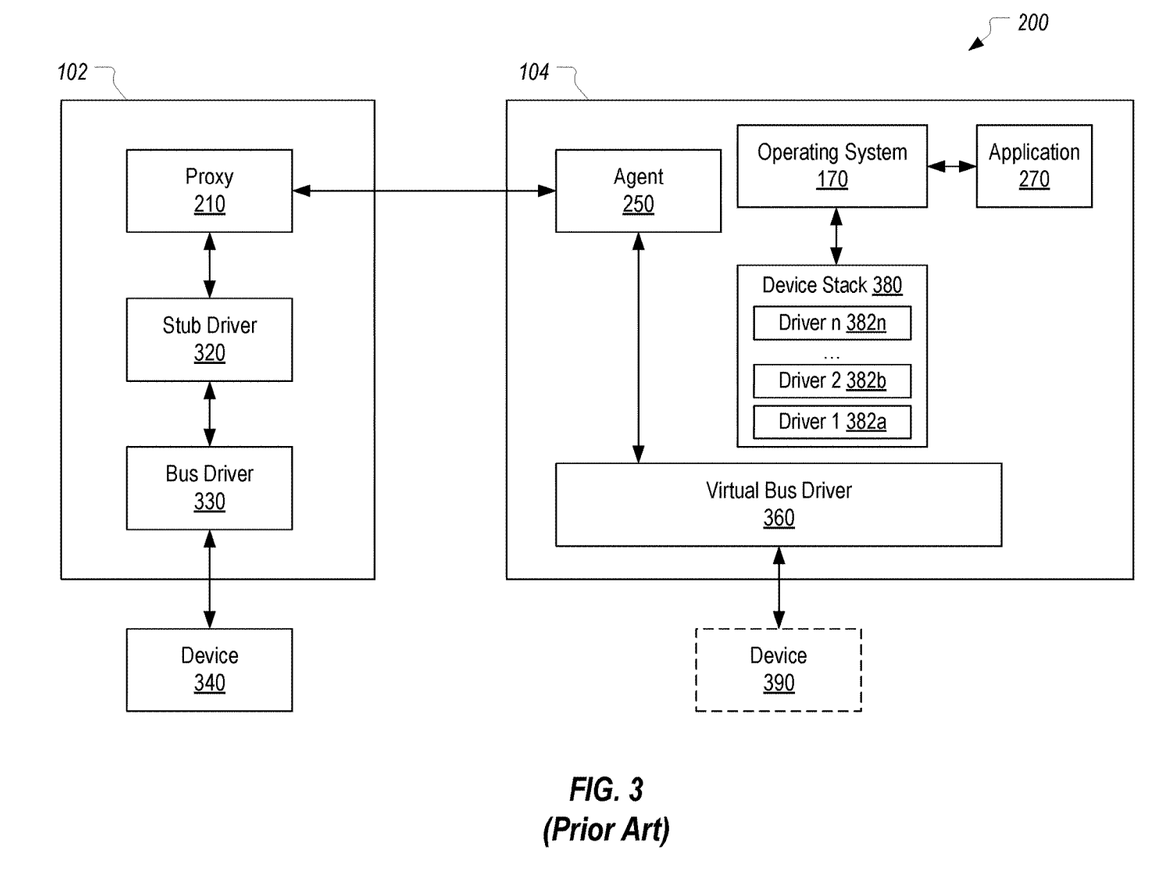
FIG. 3 illustrates how a USB device that is not a mass storage device can be redirected to the server.

FIGS. 1-3 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands Together, these aspects allow the user at client 102 to locally view and input commands to the desktop and/or application that is running remotely on server 104. From the perspective of the client side, the desktop running on server 104 may represent a virtual desktop environment.

Windows I/O uses a layered architecture where device drivers are on a device stack. In a basic model, the top of the stack is the file system. Next is the volume manager, followed by the disk driver. At the bottom of the device stack are the port and miniport drivers. When an I/O request reaches the file system, it takes the block number of the file and translates it to an offset in the volume. The volume manager then translates the volume offset to a block number on the disk and passes the request to the disk driver. When the request reaches the disk driver it will create a Command Descriptor Block (CDB) that will be sent to the SCSI device. The disk driver imbeds the CDB into a structure called the SCSI_REQUEST_BLOCK (SRB). This SRB is sent to the port driver as part of the I/O request packet (IRP).

The port driver does most of the request processing including providing timing services for requests, enforcing queue depth (making sure that a device does not get more requests that it can handle), and building scatter gather arrays for data buffers. The port driver interfaces with a driver called the miniport. The miniport driver is designed by the hardware manufacturer to work with a specific adapter and is responsible for taking requests from the port driver and sending them to the target logical unit number (LUN). The port driver calls the HwStorStartIo( ) function to send requests to the miniport, and the miniport will send the requests to the LUN. When the request is complete, the miniport will call StorPortNotification( ) with the NotificationType parameter value set to RequestComplete, along with a pointer to the completed SRB.

When a request is sent to the miniport, the port driver will put the request in a pending queue. When the request is completed, it is removed from this queue. While requests are in the pending queue they are timed. There is one timer per logical unit and it is initialized to −1. When the first request is sent to the miniport the timer is set to the timeout value in the SRB.

The timer is decremented once per second. When a request completes, the timer is refreshed with the timeout value of the head request in the pending queue. So, as long as requests complete the timer will never go to zero. If the timer does go to zero, it means the device has stopped responding. In response, the port driver logs an error and takes corrective action by trying to reset the unit. When the unit is reset, all outstanding requests are completed with an error and they are retried. When the pending queue empties, the timer is set to −1 which is its initial value.

FIG. 2 is a block diagram of a local device virtualization system 200 which can implement this type of functionality when a USB mass storage device is redirected from a client 102 to a server 104 over a remote session. As shown, while client 102 has established a remote session with server 104, a USB mass storage device 240 is connected to client 102. In accordance with embodiments of the present invention, client 102 can be configured to redirect device 240 over the remote session so that the device is accessible on server 104. Proxy 210 on client 102 and agent 250 on server 104 can be configured to establish and maintain the remote session to enable this redirection.

FIG. 2 provides a general overview of the primary components that can be employed to redirect mass storage device 240 at the disk level. This technique can be referred to as disk level redirection and is distinguished from general USB redirection in that the redirection occurs at the disk level rather than at the USB device level. In particular, client 102 can include a disk driver stack 220 that includes a disk driver 220a, a USB storage driver 220b, and a USB hub driver 220c. As is known in the art, USB storage driver 220b and USB hub driver 220c can implement the USB protocol to enable communication with device 240 as a USB mass storage device. Disk driver 220a, which in some embodiments may be an instance of the disk.sys process, can function to service read/write requests and to abstract the underlying USB storage and hub drivers 220b, 220c.

On the server side, a corresponding disk driver 282, which may be another instance of the disk.sys process, may sit below a file system stack 280 to receive and convert file system requests to disk requests (e.g., by creating a CDB and embedding it in an SRB) and to pass these disk requests (e.g., IRPs and associated SRBs) to a virtual disk enumerator 260 at the bottom of the device stack. It is noted that a volume manager is not shown in this figure for simplicity. Virtual disk enumerator 260 functions to virtualize mass storage device 240 on server 104 (as represented by virtual mass storage device 290). This virtualization is accomplished by routing the disk requests to agent 250 which will forward them over the remote session to proxy 210, down through disk driver stack 220, and to mass storage device 240 where they can be fulfilled. Corresponding responses can then be routed in a reverse direction towards virtual disk enumerator 260 and up through disk driver 282, file system stack 280, and ultimately to an application 270 that originated the request.

Virtual disk enumerator 260 can implement the port driver and miniport driver functionality described above. In particular, virtual disk enumerator 260 can implement the timer functionality for determining when an SRB has timed out, and, when a timeout occurs, can implement functionality to retry the outstanding requests.

FIG. 3 is a block diagram of local device virtualization system 200 when a device 340, which is not a mass storage device, is redirected to server 104. Regardless of the type of device that is redirected, the same general process is implemented. However, as shown in FIG. 3, when the redirected device 340 is not a mass storage device, the device is redirected at the USB level rather than at the disk level. Accordingly, in FIG. 3, client 102 includes a bus driver 330 (which would also be present in FIG. 2) and stub driver 320. Stub driver 320's primary function is to route the USB protocol data between device 340 and virtual bus driver 360. A device stack 380 that may include a number of drivers 382a-382n is layered on top of the virtual bus driver 360. These drivers 382a-382n perform the necessary functionality to allow operating system 170 and/or application 270 to access device 340 as a virtual device 390. For example, drivers 382a-382n can include any USB drivers or device specific drivers.

For purposes of the present invention, the important distinction between FIG. 2 and FIG. 3 is that, when a USB mass storage device is redirected, virtual disk enumerator 260, which includes port driver and miniport driver functionality, will be executed on server 104, whereas, when other types of USB devices are redirected (or at least USB devices that do not implement the SCSI standard), there will not be a SCSI component on server 104 that implements SCSI error checking and handling.

Whenever a device is redirected over a remote session, proxy 210 and agent 250 employ a transport layer connection to communicate. The transport layer connection may typically be established using either the Transmission Control Protocol (TCP) or the User Datagram Protocol (UDP). The primary distinction between these two protocols is that TCP provides reliability mechanisms while UDP does not. These reliability mechanisms include error checking, ordered delivery, and error recovery among others.

When TCP is used as the transport layer protocol, the implementation of the reliability mechanisms add substantial overhead thereby increasing the amount of time to deliver a packet over the connection. To address such issues, UDP may be employed as the transport layer protocol while implementing reliability mechanisms at the application level (e.g., by implementing Reliable UDP). In many cases, implementing the reliability mechanisms at the application level (e.g., within proxy 210 and agent 250) in conjunction with UDP can improve performance beyond what is attainable with TCP. However, there are still many situations where the reliability mechanisms will not be implemented optimally at the application layer thereby degrading the performance of the connection below that of TCP.

BRIEF SUMMARY

The present invention extends to methods, systems, and computer program products for selectively implementing reliability mechanisms based on the type of USB device that is redirected over a remote session. When a client attempts to redirect a device over a remote session, an agent, which executes on the server for the purpose of establishing the connection over which the remote session is established, can be configured to detect the type of device that is being redirected. If the device is a mass storage device that implements the SCSI standard, and if a connectionless datagram protocol is employed to establish the connection (e.g., UDP), the agent can implement some reliability mechanisms such as reordering and windowing but not the recovery of lost packets. In contrast, if the device does not implement the SCSI standard, the agent can implement each reliability mechanism including the recovery of lost packets.

When the redirected device implements the SCSI standard, a virtual disk enumerator on the server, which incorporates the port driver and miniport driver functionality, will implement SCSI error checking and handling on the SRBs that are transported over the connection. Accordingly, in such cases, the agent can forgo implementing the recovery of lost packets and instead rely on the error checking and handling that will be performed on the SRBs to identify when a packet has been lost. In this way, the agent can selectively minimize the amount of processing that will be performed to provide reliability mechanisms for the connection.

In one embodiment, the present invention is implemented in a virtual desktop infrastructure environment as a method for selectively providing reliability mechanisms for a connection based on the type of USB device that is redirected in a remote session over the connection. In response to determining that a device connected to a client is to be redirected to a server with which the client has established a remote session, it can be determined which transport layer protocol will be employed to establish a connection for transferring I/O data pertaining to the redirected device. when it is determined that the transport layer protocol is a connectionless datagram protocol, the provision of one or more reliability mechanisms, other than lost packet recovery, can be enabled at an application layer to ensure the reliability of packets transferred using the connectionless datagram protocol. It can also be determined whether the redirected device is a mass storage device. When it is determined that the redirected device is not a mass storage device, the provision of lost packet recovery can also be enabled at the application layer. In contrast, when it is determined that the redirected device is a mass storage device, lost packet recovery will not be provided.

In another embodiment, the present invention is implemented as computer storage media storing computer executable instructions which when executed by one or more processors implement a method for selectively providing reliability mechanisms for a connection based on the type of USB device that is redirected in a remote session over the connection. The method can include: determining that a device connected to a client is to be redirected to a server with which the client has established a remote session; determining whether the redirected device is a mass storage device; and when it is determined that the redirected device is not a mass storage device, enabling the provision of lost packet recovery at the application layer, whereas, when it is determined that the redirected device is a mass storage device, forgoing the provision of lost packet recovery at the application layer.

In another embodiment, the present invention can be implemented as a system for selectively providing reliability mechanisms for a connection based on the type of device that is redirected in a remote session over the connection. The system can include: a client-side proxy that is configured to establish a remote session with a server-side agent; a disk driver stack that is loaded on the client when a mass storage device is connected to the client while the proxy has established a remote session with the agent to thereby allow the mass storage device to be redirected over the remote session to the server; and a virtual disk enumerator that is loaded on the server when the mass storage device is redirected to the server. The proxy and the agent can each be configured to selectively provide reliability mechanisms to a connection over which the mass storage device is redirected. This selective provision of reliability mechanisms can be implemented by detecting that the connection will employ a connectionless datagram transport; detecting that I/O data pertaining to the mass storage device is to be transported over the connection such that the virtual disk enumerator will perform error checking and handling on the I/O data; and providing one or more reliability mechanisms other than lost packet recovery to ensure reliability of the connection.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can be implemented as part of a virtual desktop infrastructure (VDI) environment to minimize the amount of overhead required to provide a reliable connection for redirecting a device in a remote session. Although the implementation of disk level redirection reduces the amount of data that must be transferred over the connection and the use of a connectionless datagram protocol such as UDP in conjunction with application layer reliability mechanisms further minimizes overhead, these techniques still may not provide optimal performance in all situations. By selectively implementing lost packet recovery based on the type of redirected device, the present invention can further optimize a remote session.

In this specification, references to the provision of reliability mechanisms at the application layer should be construed as providing any type of reliability mechanism at a layer above the transport layer. In other words, even if the reliability mechanisms could be construed as being provided at the session or presentation layer, they should be considered as being provided at the application layer for purposes of this disclosure and claims.

A connectionless datagram protocol should be construed generally as encompassing any transport layer protocol that does not provide reliability mechanisms such as windowing, packet reordering, and lost packet recovery. The most common example of a connectionless datagram protocol is UDP (as opposed to TCP which is a connection oriented protocol). Therefore, the following description will refer to UDP as an example.

Figure 4A:
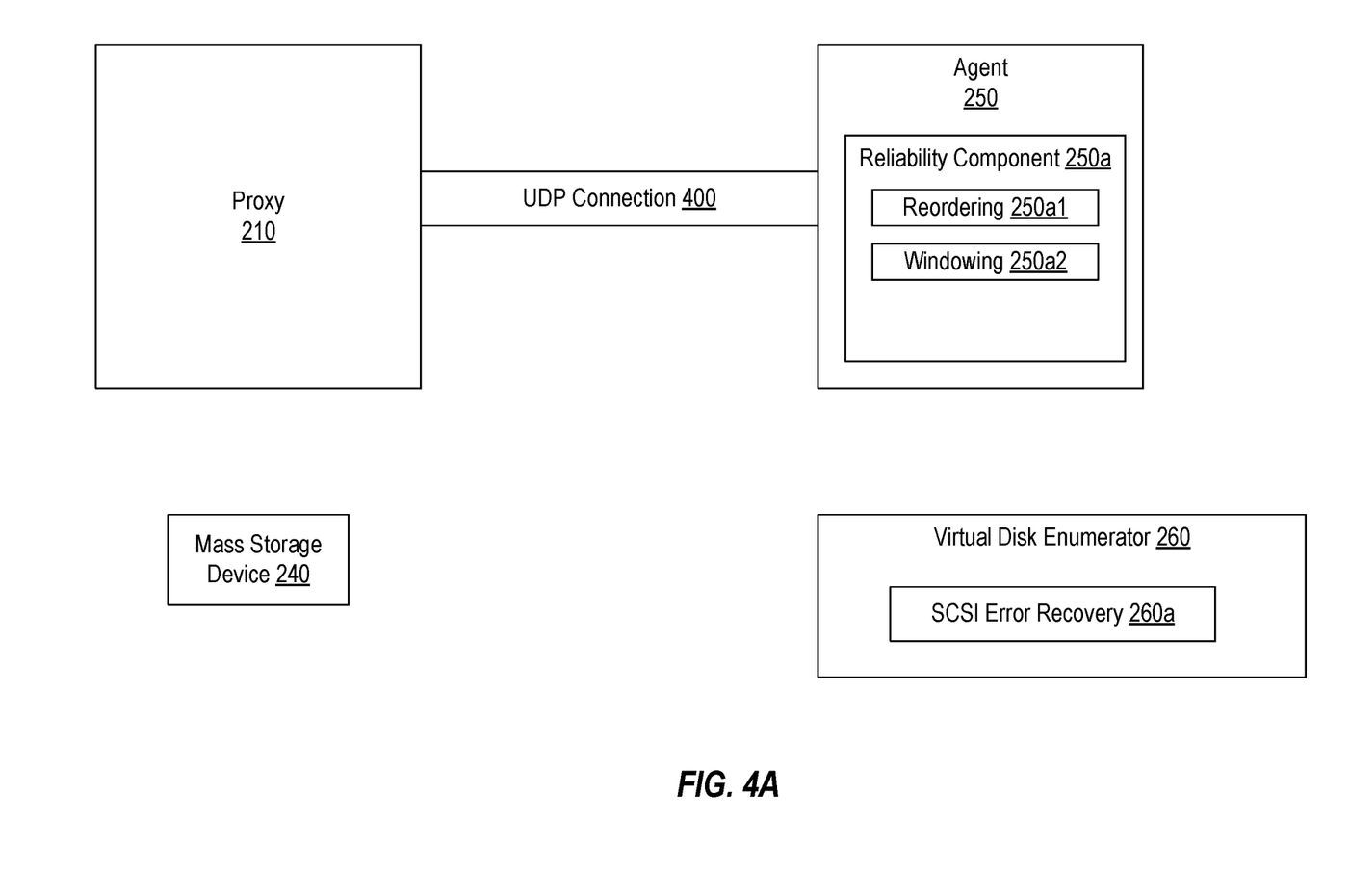
FIGS. 4A and 4B illustrate how the server-side agent can selectively implement lost packet recovery when a connectionless datagram transport layer protocol is used and based on the type of USB device that is redirected.
Figure 4B:
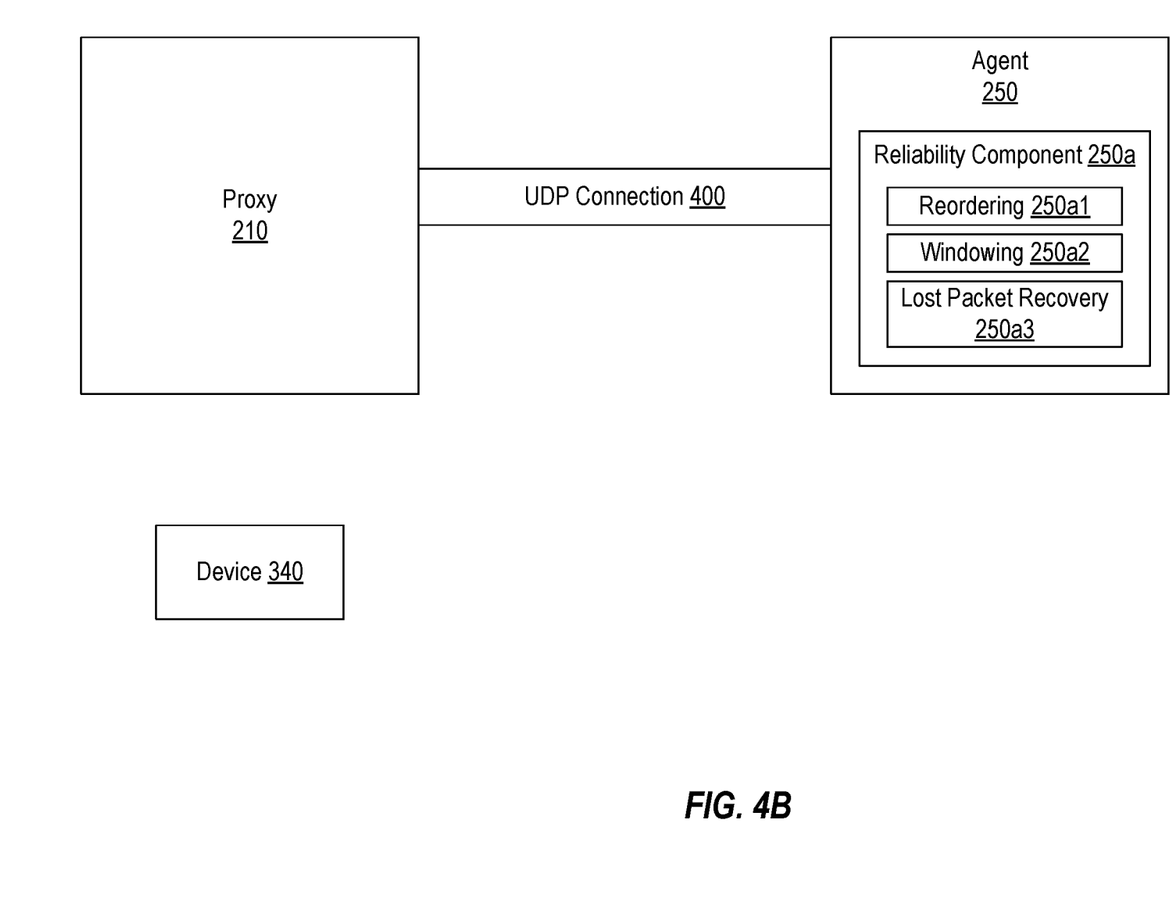

FIGS. 4A and 4B generally represent how the present invention can selectively implement reliability mechanisms based on the type of USB device that is redirected over a remote session. It is noted that, in these figures, many of the components shown in FIGS. 2 and 3 are omitted for simplicity.

FIG. 4A represents the case where a mass storage device 240 is connected to client 102 while client 102 has established a remote session with server 104. Accordingly, FIG. 4A depicts that a UDP connection 400 is established between proxy 210 and agent 250 for the purpose of redirecting mass storage device 240. In some embodiments, proxy 210 and agent 250 could be configured to employ either UDP or TCP for this connection. However, for purposes of the present example, it will be assumed that UDP will be employed. In contrast, if TCP were employed, agent 250 would not need to provide any reliability mechanisms.

In accordance with embodiments of the present invention, as part of establishing UDP connection 400, agent 250 can identify what type of device is being redirected. For example, when proxy 210 initially reports the connection of device 240, agent 250 could examine the reported information to identify that the reported device is a mass storage device (e.g., by examining any plug-and-play information provided by the device).

As described in the background, when mass storage device 240 is redirected, the appropriate drivers will be loaded on server 104. These loaded drivers will include virtual disk enumerator 260 which provides the port driver (e.g., the Windows Storport driver, storport.sys) and the appropriate miniport driver. Virtual disk enumerator 260 will therefore include SCSI error recovery functionality 260*a*.

When the redirected device is a mass storage device, agent 250 can establish UDP connection 400 in conjunction with the provision of reliability mechanisms to ensure that data can be transferred over connection 400 in a reliable manner. Agent 250 is therefore depicted as including a reliability component 250*a*. However, because it has detected that the redirected device is a mass storage device (i.e., that the redirected device conforms to the SCSI standard), agent 250 can configure reliability component 250*a* to not provide lost packet recovery for connection 400. Instead, as shown in FIG. 4A, reliability component 250*a* can include a reordering module 250*a*1 and a windowing module 250*a*2 that are configured to provide packet reordering and windowing functionality respectively on connection 400. Although not shown, reliability component 250 could be configured to provide other reliability mechanisms such as, for example, all reliability mechanisms provided by Reliable UDP except for lost packet recovery. Also, although not shown, proxy 210 would be selectively configured with appropriate functionality to allow reliability component 250 to provide the selected reliability mechanisms at the application layer. A more detailed example will be provided below with reference to FIG. 5.

Because virtual disk enumerator 260 provides SCSI error recovery functionality 260*a*, virtual disk enumerator 260 will track whether each SRB sent to device 240 has been completed. If an SRB is not completed before the specified timeout period has elapsed (e.g., due to one or more packets containing the SRB being lost during transmission over connection 400), virtual disk enumerator 260 will detect the timeout and retry the request. Therefore, even though agent 250 is not implementing lost packet detection, virtual disk enumerator 260 will still be able to detect when a packet has been lost because the corresponding SRB will never be completed.

Anytime an SRB is not timely completed, virtual disk enumerator 260 will cause the corresponding request to be resubmitted which, in essence, is functionally equivalent to agent 250 requesting that a lost packet be resent. However, because this SCSI error recovery will be performed regardless of the type or transport layer protocol used for connection 400 or the type of reliability mechanisms implemented at the application layer, by forgoing lost packet recovery, agent 250 can minimize the overhead required to provide a reliable connection.

In contrast to FIG. 4A, FIG. 4B represents the case where agent 250 will selectively perform lost packet recovery. In FIG. 4B, it is assumed that device 340, which is not a mass storage device that conforms to the SCSI standard, is connected to client 102 while client 102 has established a remote session with server 104. Because device 340 is not a mass storage device, virtual disk enumerator 260 (or at least drivers that implement SCSI error recovery) will not be loaded in the corresponding stack on server 104.

Agent 250 can again be configured to identify the type of device 340 (e.g., by identifying a class type defined in the USB device descriptor). Because device 340 is not a SCSI device, agent 250 can establish UDP connection 400 in conjunction with the provision of reliability mechanisms at the application layer. However, as shown in FIG. 4B, reliability component 250*a* can include a reordering module 250*a*1, a windowing module 250*a*2, and a lost packet recovery module 250*a*3 (among possibly other modules) to ensure that connection 400 is reliable. Most notably, because device 340 is not a SCSI device, agent 250 will not forgo the provision of lost packet recovery for connection 400. It is again noted that, although not shown in FIG. 4B, proxy 210 can also be selectively configured to perform the appropriate functionality to enable the selected reliability mechanisms to be provided at the application layer.

To summarize, agent 250 can dynamically provision the type of reliability mechanisms it will provide for a particular connection based on whether the connection will be employed to redirect a mass storage device or another type of non-SCSI device. This selective provision of lost packet recovery is performed in a manner that is independent of the remoting protocol used to establish the remote session (e.g., RDP, ICA, PCoIP, etc.). The selective provision of lost packet recovery is also performed in manner that is largely transparent to the other components of the VDI environment, particularly to virtual disk emulator 260 and to disk driver stack 220. Accordingly, the present invention can be implemented seamlessly with minimal impact on existing VDI environments.

Figure 5A:
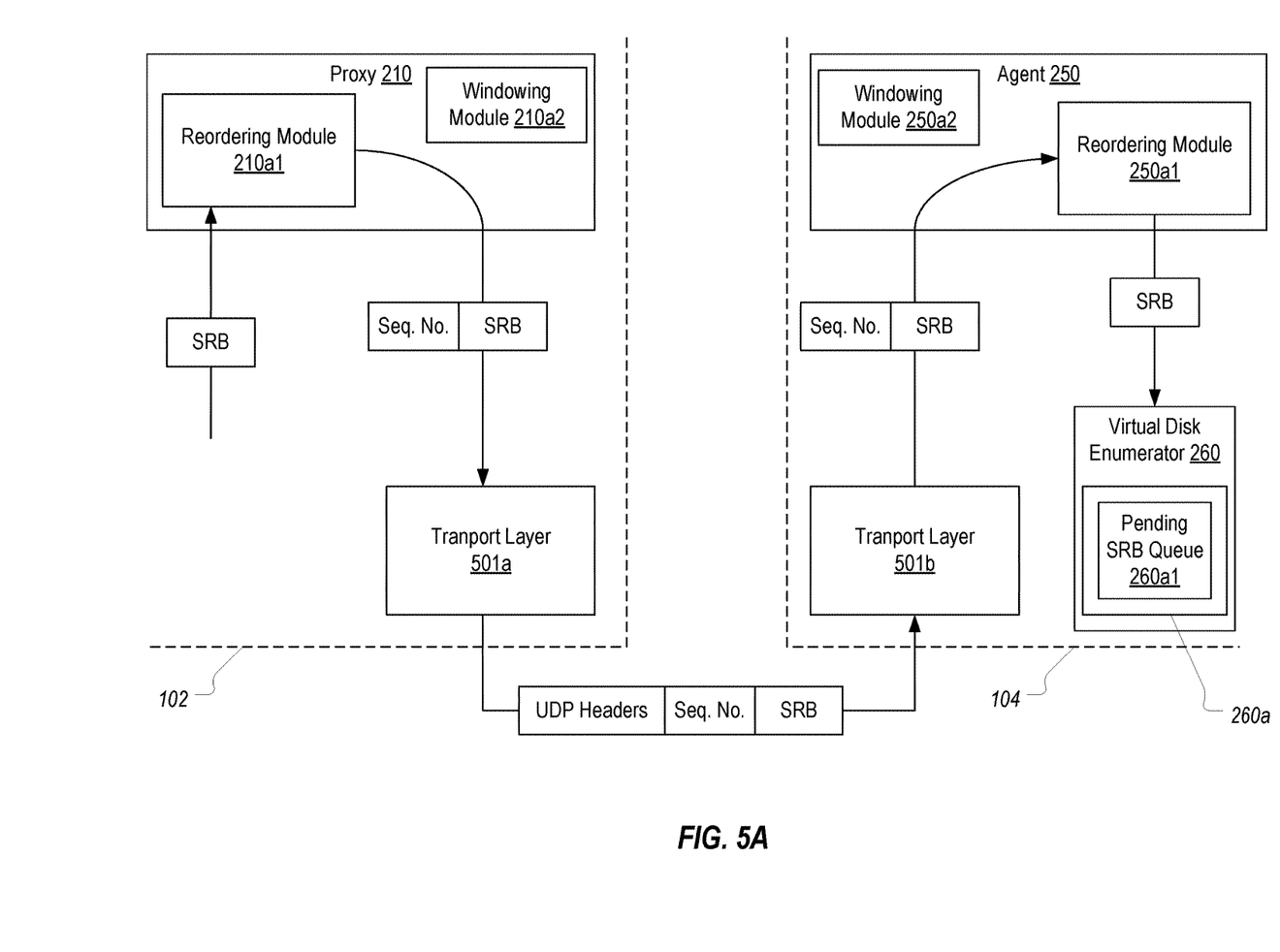
FIGS. 5A and 5B provide a more detailed example of how the server-side agent can forgo performing lost packet recovery when the redirected device is a mass storage device.
Figure 5B:
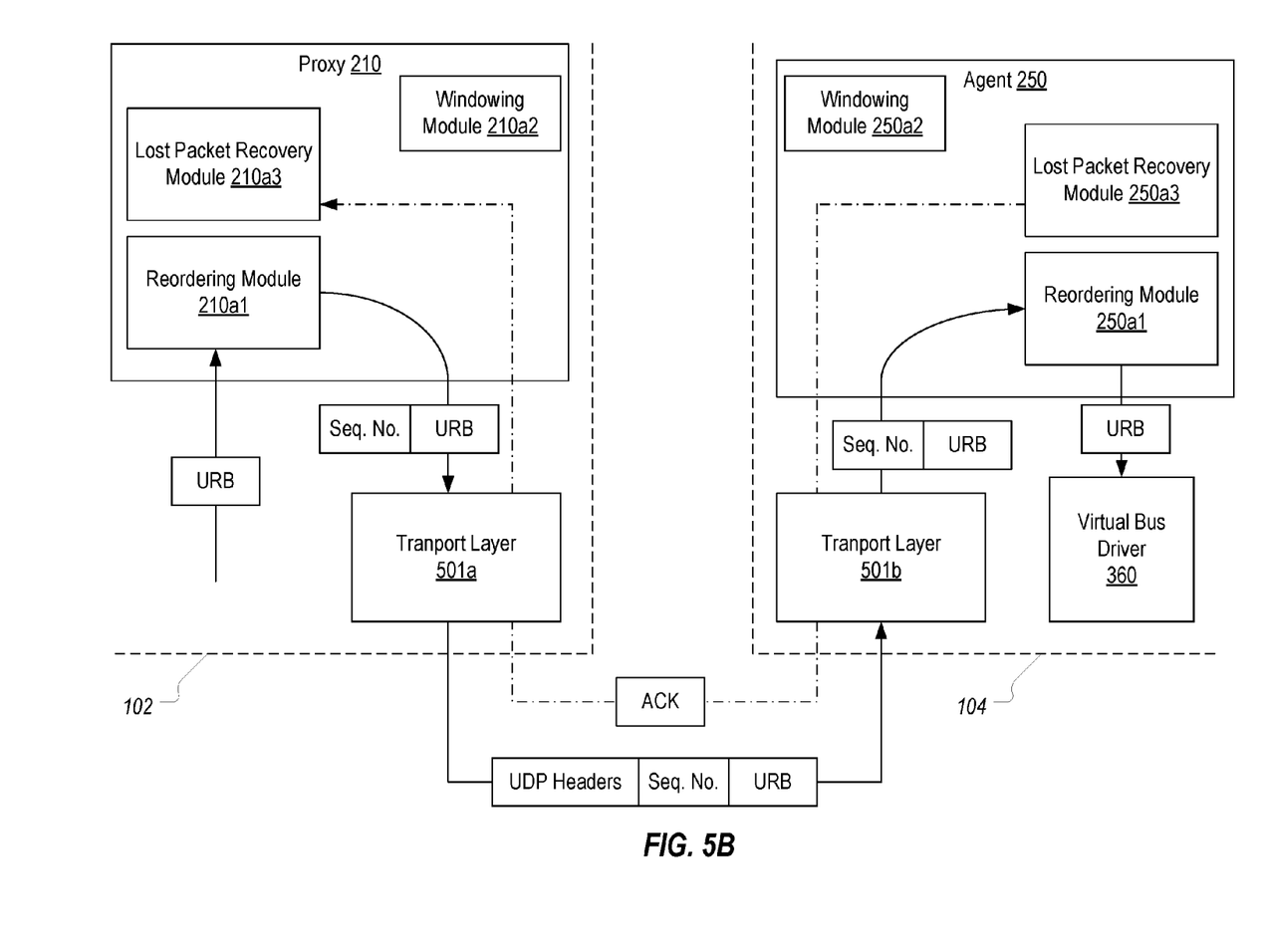

FIGS. 5A and 5B provide a more detailed representation of how the selective implementation of lost packet recovery can minimize the overhead associated with providing a reliable connection. FIG. 5A represents the case where mass storage device 240 is redirected and generally presents how data may be transferred over connection 400 in response to an I/O request from application 270 executing on server 104.

As shown, proxy 210 can receive SRBs from the underlying disk driver stack 220 containing the requested data (e.g., data read from mass storage device 240). Proxy 210 includes a reordering module 210*a*1 which can represent the functionality performed by proxy 210 to allow agent 250 to identify the proper order of received packets. For example, reordering module 210*a*1 could append a sequence number to an SRB and then submit the SRB and appended sequence number to the transport layer 501*a* (e.g., by calling a UDP socket API provided by the operating system on client 102).

Because it is assumed that UDP is employed as the transport layer protocol, transport layer 501*a* will append appropriate UDP headers to the application layer payload (i.e., the SRB with appended sequence number) and send the UDP packet to server 104. Transport layer 501*b* will then receive the UDP packet, strip the UDP header, and provide the application layer payload to agent 250. As shown, agent 250 can provide a reordering module 250*a*1 that is configured to ensure that the UDP packets are received in order. For example, reordering module 250*a*1 can represent a receive buffer into which the SRBs are placed based on their sequence number. Once it is known that an SRB has been received in order, virtual disk enumerator 260 can be allowed to receive the SRB.

Proxy 210 and agent 250 are also shown as including windowing modules 210*a*2 and 250*a*2 respectively. These windowing modules generally represent that proxy 210 and agent 250 can be configured to implement windowing for connection 400. As windowing is known by those skilled in the art, no further detail will be provided. Suffice it to say that proxy 210 and agent 250 can implement windowing when UDP is employed as the transport layer protocol.

As described above, virtual disk enumerator 260 can include SCSI error recovery functionality 260a. As shown in FIG. 5A, this functionality can include a pending SRB queue 260a1 that tracks pending SRBs and their corresponding timeout periods. In FIG. 5A, it is assumed that pending SRB queue 260a1 would include an entry for the SRB that is shown as being received. Accordingly, upon receiving this SRB, virtual disk enumerator 260 would process the SRB accordingly, including updating queue 260a1 to remove the corresponding entry, and forward the corresponding I/O data on to the higher level drivers.

However, if one or more packets containing an SRB are lost during transmission over connection 400, the timeout period for that SRB would elapse causing virtual disk enumerator 260 to retry the request. Although not shown in FIG. 5A, this would entail virtual disk enumerator 260 sending the appropriately configured SRB to agent 250 for routing to mass storage device 240. Accordingly, if a packet is lost over connection 400, agent 250 need not be configured to detect such a loss. Instead, virtual disk enumerator 260 can be relied upon for detecting the lost SRB and causing it to be requested again.

As can be seen in FIG. 5A, agent 250 does not include lost packet recovery module 250a3 and therefore requires less overhead to provide connection 400. The reduction in this overhead can best be seen by comparing FIG. 5A to FIG. 5B which represents the case where device 340, a non-SCSI device, is redirected.

As in FIG. 5A, FIG. 5B shows that proxy 210 and agent 250 can include reordering modules 210a1, 250a1 and windowing modules 210a2, 250a2 respectively. These modules can perform a similar function as described above. The primary distinction being that in FIG. 5B, because device 340 is redirected at the USB level, proxy 210 will receive a USB request block (URB) and append a sequence number to it. Also, once reordering module 250a1 determines that a URB has been received in order, the URB can be provided to virtual bus driver 360 for routing to the appropriate device stack.

In contrast to FIG. 5A, proxy 210 and agent 250 are also shown as including lost packet recovery modules 210a3, 250a3 respectively. The lost packet recovery modules can be configured to allow proxy 210 to determine when agent 250 has not received a transmitted packet. As represented in FIG. 5B, this can be accomplished by lost packet recovery module 210a3 maintaining a list of transmitted packets (e.g., a list of sequence numbers) that have not yet been acknowledged and by lost packet recovery module 250a3 sending an acknowledgement identifying each packet that is receives. If lost packet recover module 210a3 determines that a packet has not been acknowledged (e.g., after a specified amount of time has elapsed without acknowledgement), it can resend the packet.

As can be imagined, the implementation of lost packet recovery modules 210a3, 250a3 adds substantial overhead to both proxy 210 and agent 250 and can potentially slow the data transfer rate over connection 400. Accordingly, whenever it is determined that the connection will be employed to redirect a mass storage device that conforms to the SCSI standard, proxy 210 and agent 250 can forgo implementing the lost packet recovery modules. This will allow connection 400 to be provided with less overhead but without sacrificing reliability due to virtual disk enumerator 260's role in ensuring that SRBs are timely received.

Figure 6:
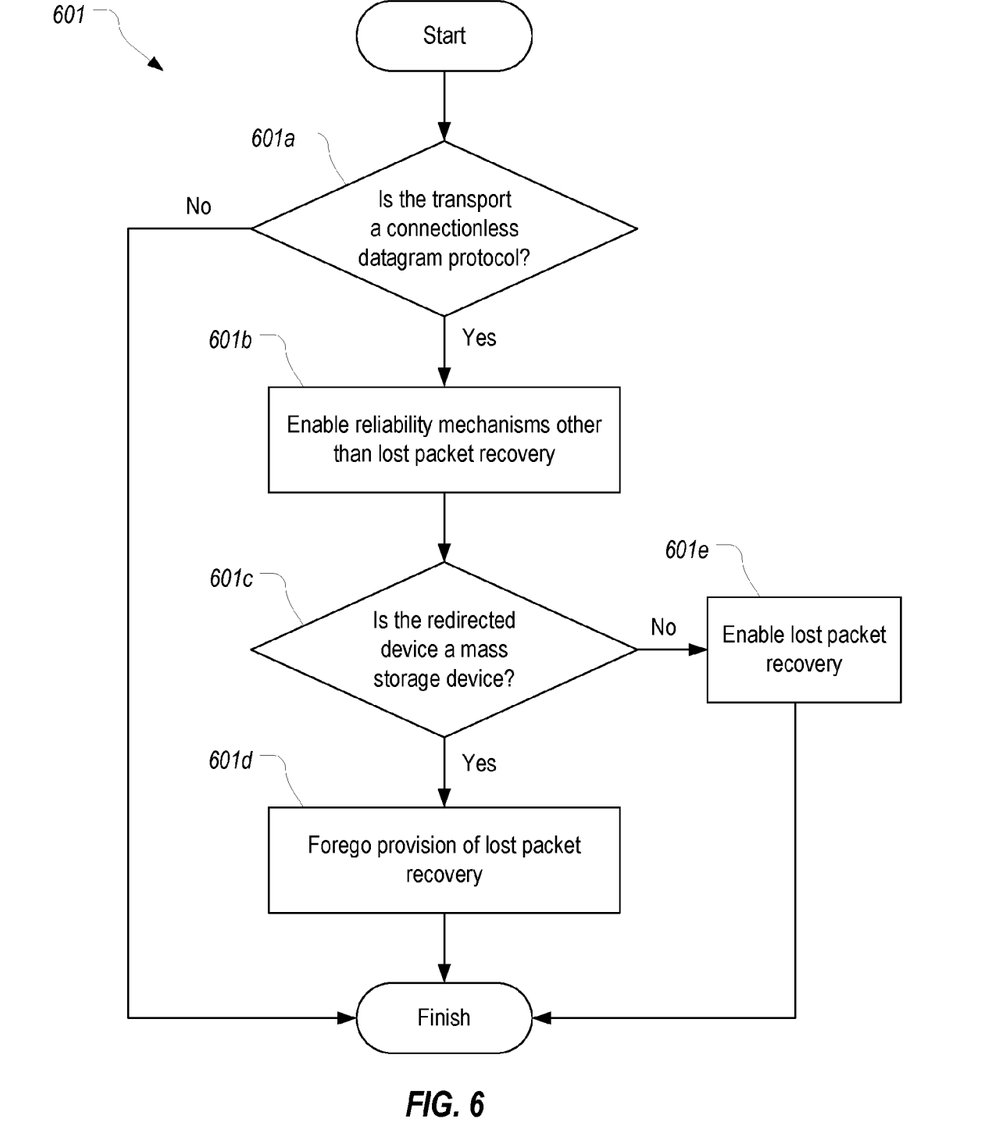
FIG. 6 illustrates a flowchart of an example process that can be followed to selectively implement reliability mechanisms based on the type of USB device that is redirected over a remote session.

FIG. 6 illustrates a flowchart of an example process 601 that can be performed to selectively implement reliability mechanisms based on the type of USB device that is redirected over a remote session. Process 601 will be described as being performed by agent 250 on server 104. However, it is to be understood that a corresponding process can be performed by proxy 210 to allow the selected reliability mechanisms to be provided. Process 601 can be performed as part of establishing a connection, such as connection 400, over which I/O data pertaining to a redirected device is transferred.

As an initial step 601a, agent 250 can determine whether the transport to be employed for the connection is a connectionless datagram protocol (e.g., UDP as opposed to TCP). Whether a connectionless datagram protocol or a connection-oriented protocol is employed as the transport can be based on any number of configuration parameters of the VDI environment.

In step 601a, if it is determined that a connectionless datagram protocol will not be employed, agent 250 can forgo providing any reliability mechanisms for the connection since reliability will be provided by the transport. In contrast, if it is determined in step 601a that a connectionless datagram protocol will be employed, agent 250 can enable reliability mechanisms other than lost packet recovery for the connection in step 601b. For example, agent 250 can coordinate with proxy 210 to ensure that windowing and packet ordering can be provided for the connection.

Next, in step 601c, it can be determined whether the redirected device is a mass storage device. If so, in step 601d, agent 250 can forego the provision of lost packet recovery. Instead, lost packet recovery can be effectively implemented by relying on the SCSI error handling that will be performed by virtual disk enumerator 260. In contrast, if it is determined that the redirected device is not a mass storage device (or at least is not a SCSI device), agent 250 can enable lost packet recovery in step 601e. For example, agent 250 can coordinate with proxy 210 to ensure that proxy 210 will resend any packets that agent 250 does not acknowledge receiving.

Figure 7:
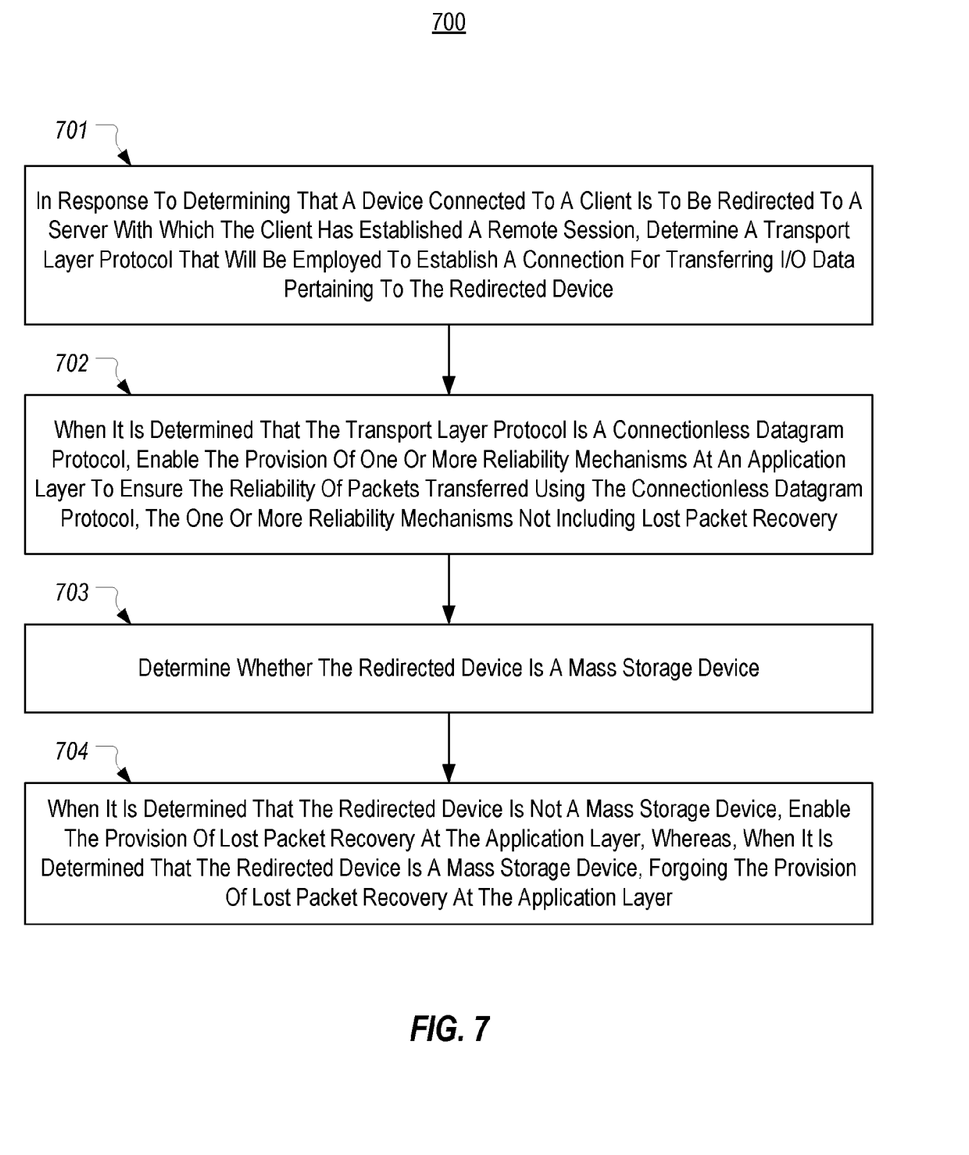
FIG. 7 illustrates a flowchart of an example method for selectively providing reliability mechanisms for a connection based on the type of USB device that is redirected in a remote session over the connection.

FIG. 7 illustrates a flowchart of an example method 700 for selectively providing reliability mechanisms for a connection based on the type of USB device that is redirected in a remote session over the connection. As an example, method 700 can be implemented by one or both of agent 250 and proxy 210 in a VDI environment such as in local device virtualization system 200.

Method 700 includes an act 701 of, in response to determining that a device connected to a client is to be redirected to a server with which the client has established a remote session, determining a transport layer protocol that will be employed to establish a connection for transferring I/O data pertaining to the redirected device. For example, in response to determining that mass storage device 240 or device 340 is to be redirected to server 104, agent 250 can determine whether UDP or TCP will be employed as the transport layer protocol for transferring redirected I/O data.

Method 700 includes an act 702 of, when it is determined that the transport layer protocol is a connectionless datagram protocol, enabling the provision of one or more reliability mechanisms at an application layer to ensure the reliability of packets transferred using the connectionless datagram protocol, the one or more reliability mechanisms not including lost packet recovery. For example, agent 250 can determine that UDP will be employed as the transport layer protocol and can coordinate with proxy 210 to implement windowing and ordered packet delivery.

Method 700 includes an act 703 of determining whether the redirected device is a mass storage device. For example, agent 250 can determine whether mass storage device 240 or device 340 is being redirected.

Method 700 includes an act 704 of, when it is determined that the redirected device is not a mass storage device, enabling the provision of lost packet recovery at the application layer, whereas, when it is determined that the redirected device is a mass storage device, forgoing the provision of lost packet recovery at the application layer. For example, when agent 250 determines that device 340, which is not a mass storage device, is being redirected, agent 250 can coordinate with proxy 210 to enable the provision of lost packet recovery for the UDP connection. In contrast, when agent 250 determines that mass storage device 240 is being redirected, agent 250 can forego the provision of lost packet recovery.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented in a virtual desktop infrastructure environment, for selectively providing reliability mechanisms for a connection based on the type of USB device that is redirected in a remote session over the connection, the method comprising:
   in response to determining that a device connected to a client is to be redirected to a server with which the client has established a remote session, determining a transport layer protocol that will be employed to establish a connection for transferring I/O data pertaining to the redirected device;
   when it is determined that the transport layer protocol is a connectionless datagram protocol, enabling the provision of one or more reliability mechanisms at an application layer to ensure the reliability of packets transferred using the connectionless datagram protocol, the one or more reliability mechanisms not including lost packet recovery;
   determining whether the redirected device is a mass storage device; and
   when it is determined that the redirected device is not a mass storage device, enabling the provision of lost packet recovery at the application layer, whereas, when it is determined that the redirected device is a mass storage device, forgoing the provision of lost packet recovery at the application layer.

2. The method of claim 1, wherein the connectionless datagram protocol is UDP.

3. The method of claim 1, wherein the one or more reliability mechanisms include one or more of windowing or ordered packet delivery.

4. The method of claim 1, wherein determining whether the redirected device is a mass storage device comprises determining whether the redirected device is associated with one or more drivers on the server that implement the SCSI standard.

5. The method of claim 4, wherein the one or more drivers include the Storport driver.

6. The method of claim 4, wherein the one or more drivers are provided in a virtual disk emulator.

7. The method of claim 1, wherein the method is performed by an agent that executes on the server.

8. The method of claim 1, wherein the method is performed by a proxy that executes on the client.

9. The method of claim 1, wherein the redirected device is a USB device.

10. One or more computer storage media storing computer executable instructions which when executed by one or more processors implement a method for selectively providing reliability mechanisms for a connection based on the type of USB device that is redirected in a remote session over the connection, the method comprising:
    determining that a device connected to a client is to be redirected to a server with which the client has established a remote session;
    determining that a transport layer protocol that will be employed to establish a connection for transferring I/O data pertaining to the redirected device is a connectionless datagram protocol;

determining whether the redirected device is a mass storage device; and when it is determined that the redirected device is not a mass storage device, enabling the provision of lost packet recovery at the application layer, whereas, when it is determined that the redirected device is a mass storage device, forgoing the provision of lost packet recovery at the application layer.

11. The computer storage media of claim 10, wherein the method further comprises:

in response to determining that the transport layer protocol is a connectionless datagram protocol, enabling the provision of one or more reliability mechanisms at the application layer.

12. The computer storage media of claim 11, wherein the one or more reliability mechanisms include one or more of windowing or ordered packet delivery.

13. The computer storage media of claim 10, wherein the method is performed by one or both of an agent executing on the server and a proxy executing on the client.

14. The computer storage media of claim 10, wherein determining whether the redirected device is a mass storage device comprises determining whether the redirected device is associated with one or more drivers on the server that implement the SCSI standard.

15. The computer storage media of claim 14, wherein the one or more drivers include the Storport driver.

16. The computer storage media of claim 14, wherein the one or more drivers are provided in a virtual disk emulator.

17. One or more computer storage media storing computer executable instructions which implement a system for selectively providing reliability mechanisms for a connection based on the type of device that is redirected in a remote session over the connection, the system comprising:

a client-side proxy that is configured to establish a remote session with a server-side agent;

a disk driver stack that is loaded on the client when a mass storage device is connected to the client while the proxy has established a remote session with the agent to thereby allow the mass storage device to be redirected over the remote session to the server; and a virtual disk enumerator that is loaded on the server when the mass storage device is redirected to the server;

wherein the proxy and the agent are each configured to selectively provide reliability mechanisms to a connection over which the mass storage device is redirected, the selective provision including:

detecting that the connection will employ a connectionless datagram transport;

detecting that I/O data pertaining to the mass storage device is to be transported over the connection such that the virtual disk enumerator will perform error checking and handling on the I/O data; and providing one or more reliability mechanisms other than lost packet recovery to ensure reliability of the connection.

18. The computer storage media of claim 17, wherein the proxy and agent are also each configured to selectively provide lost packet recovery to a connection when it is determined that the connection will employ a connectionless datagram transport and will be employed to transport I/O data pertaining to a device that is not a mass storage device.

19. The computer storage media of claim 17, wherein the virtual disk enumerator implements a SCSI port driver and the I/O data pertaining to the mass storage device comprises SCSI request blocks.

* * * * *